March 21, 1961  V. W. LINDSTEIN  2,975,530
CIPHERING DEVICES
Filed Nov. 15, 1957  5 Sheets-Sheet 1
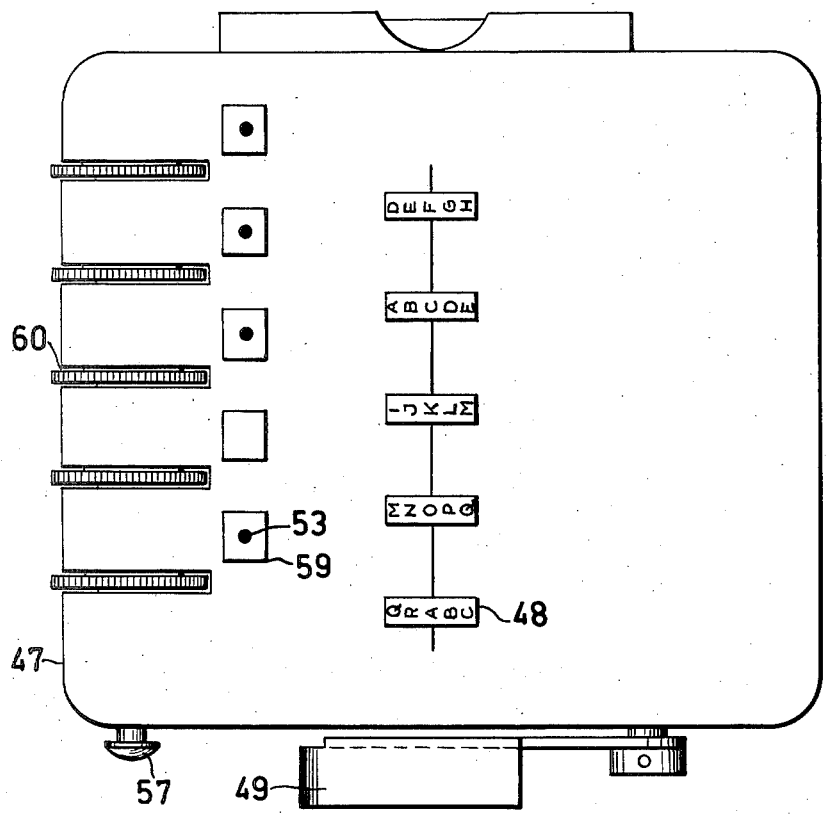
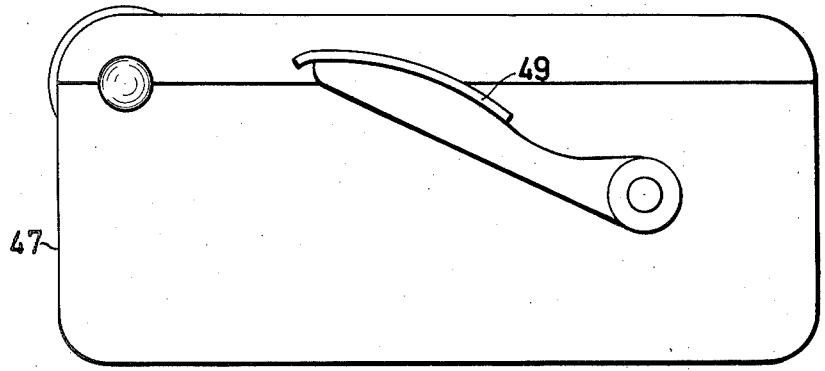
INVENTOR.
V. W. Lindstein
BY
ATTYS.

March 21, 1961  V. W. LINDSTEIN  2,975,530
CIPHERING DEVICES
Filed Nov. 15, 1957  5 Sheets-Sheet 2
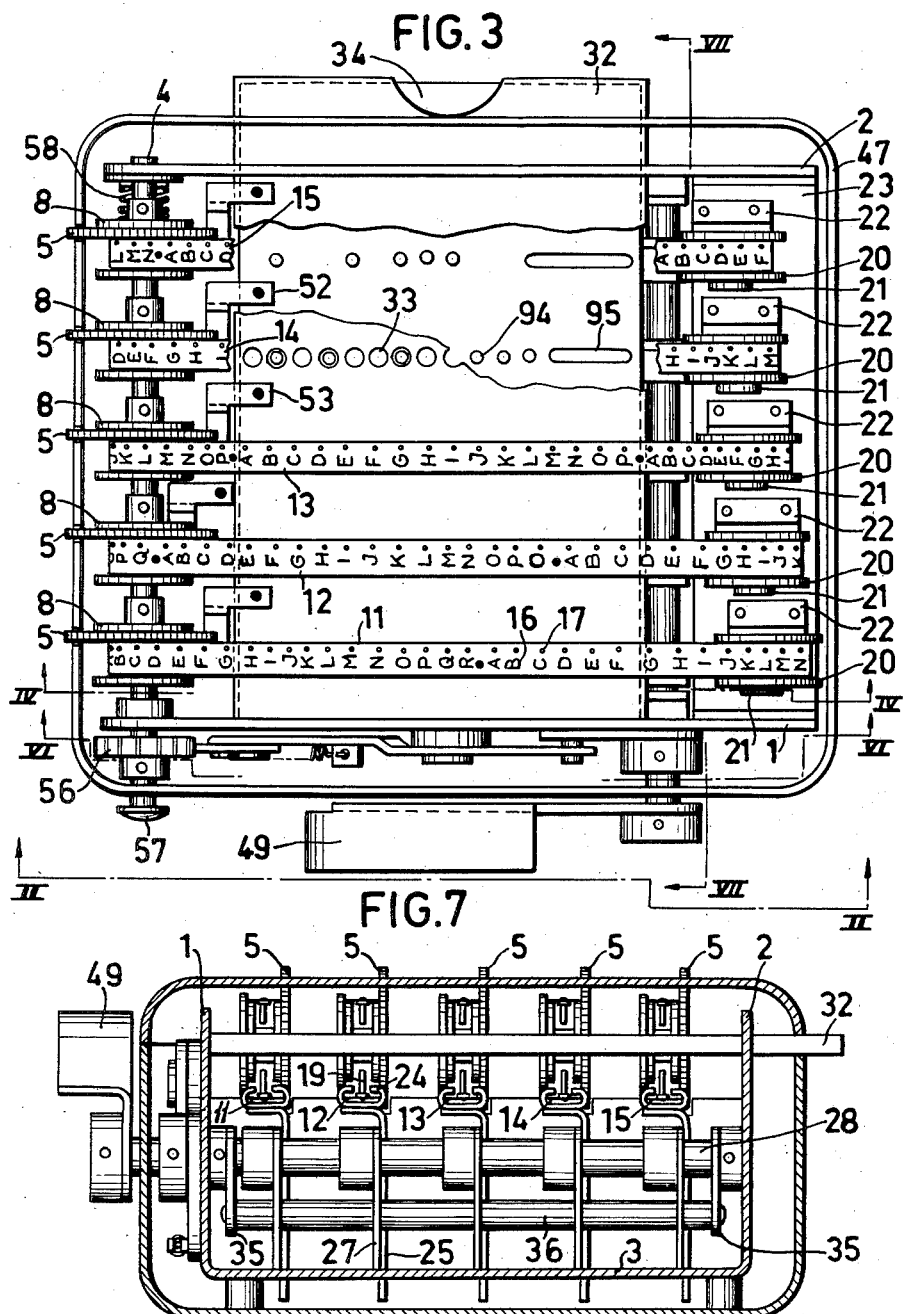
INVENTOR.
V. W. Lindstein
BY
ATTYS.

March 21, 1961 V. W. LINDSTEIN 2,975,530
CIPHERING DEVICES
Filed Nov. 15, 1957 5 Sheets-Sheet 3
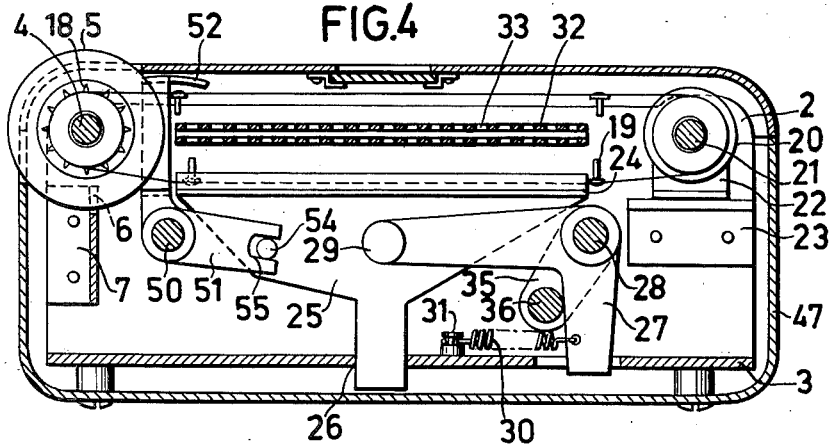
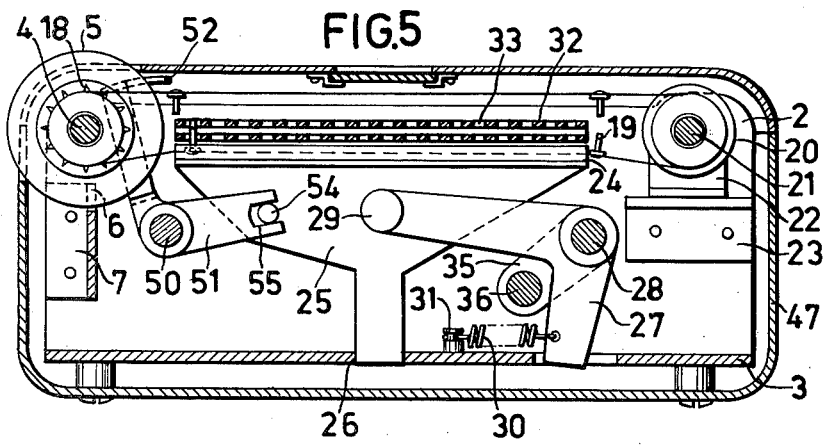
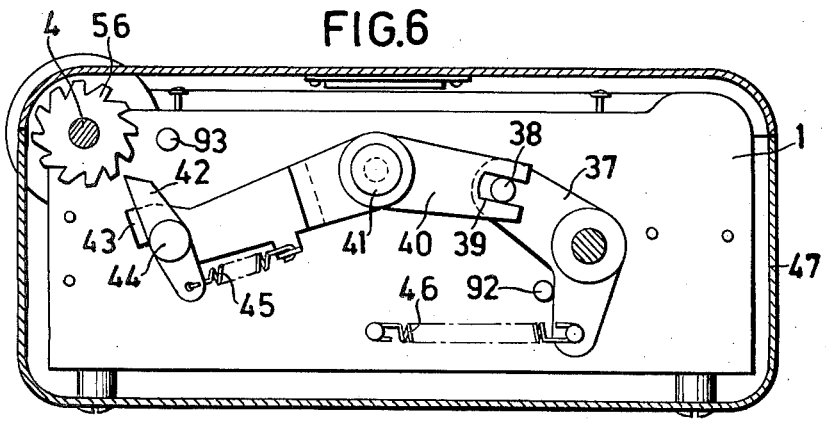
INVENTOR.
V. W. Lindstein
BY
Glascock Downing Seebold
ATTYS.

March 21, 1961 V. W. LINDSTEIN 2,975,530
CIPHERING DEVICES
Filed Nov. 15, 1957 5 Sheets-Sheet 4
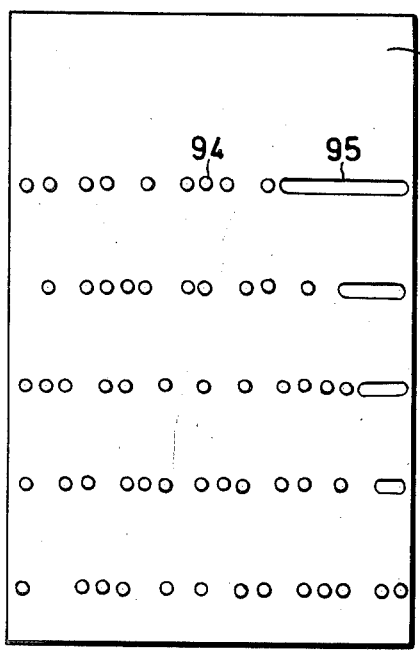
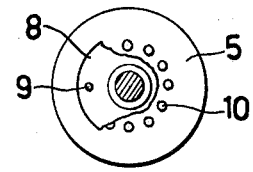
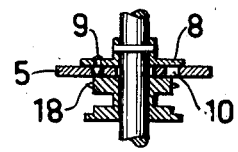
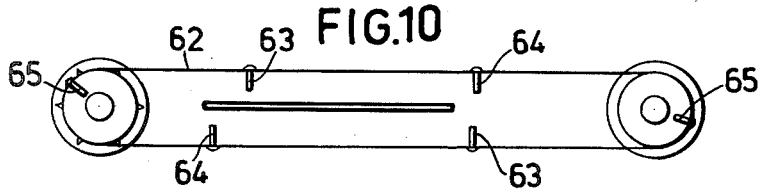
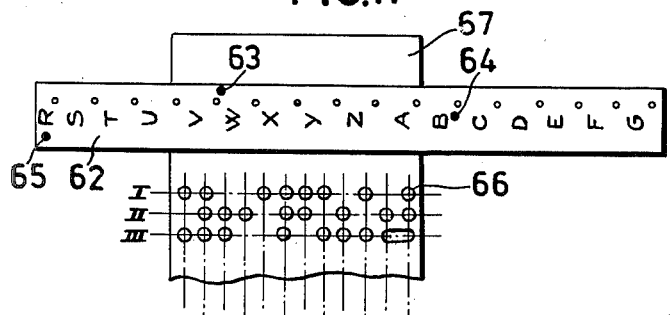
INVENTOR.
V. W. Lindstein
BY
ATTYS.

March 21, 1961

V. W. LINDSTEIN 2,975,530

CIPHERING DEVICES

Filed Nov. 15, 1957

INVENTOR.
V. W. Lindstein
ATTYS.

United States Patent Office 2,975,530
Patented Mar. 21, 1961

2,975,530

CIPHERING DEVICES

Vigo Waldemar Lindstein, Poppelvagen 10,
Bromma, Sweden

Filed Nov. 15, 1957, Ser. No. 696,847

Claims priority, application Sweden Nov. 17, 1956

7 Claims. (Cl. 35—3)

The present invention relates to such ciphering machines, which ordinarily are supplied with two or more pin- or key-wheels, whose pins are to be set in either active or inactive positions and which wheels have different numbers of pins in order to obtain series of combinations as long as possible without repetition.

It is an object of this invention to provide such ciphering machines with a very simple and handy device in order to eliminate the time consuming setting of pins when changing the inside key of the machine. It is a further object of the invention to ensure the correct setting of the inside key by using centrally manufactured setting cards, key-cards, which are punched in the same way, or by exception, by punching the cards as occasion requires, when it is very easy to check the setting on the card in contradistinction to the control of the setting of pin-wheels.

Figure 1 is a top-view of a ciphering machine according to the invention.

Figure 2 is a left hand view of the same machine.

Figure 3 is a top view of the machine with the cover removed.

Figures 4 and 5 are sections of the machine in different positions.

Figure 6 is a section which shows the advance mechanism.

Figure 7 is a front view section of the machine,

Figures 8a and b are fragmentary views of a relative setting mechanism.

Figure 9 shows a key-card.

Figures 10 and 11 show a modified form of the mechanism as shown in Figures 1–9.

Figure 12:
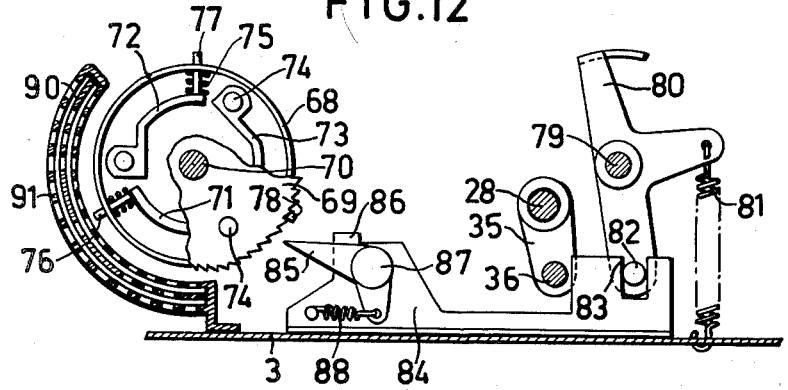
Figure 13:
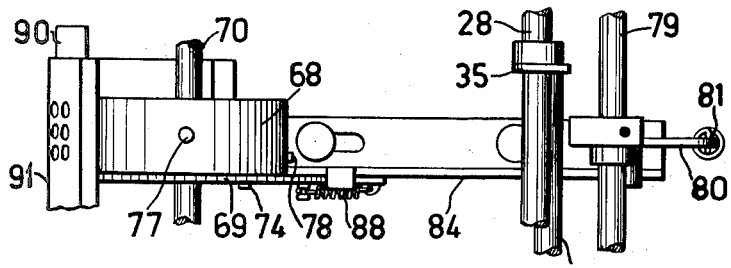
Figure 14:
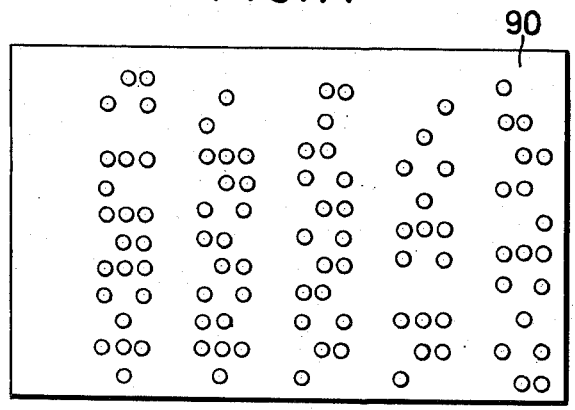

Figures 12, 13 and 14 show a further modified execution of the invention.

Between two walls 1 and 2, attached to a base 3 in Figures 3–7, a rotatable shaft 4 is mounted, provided with five identical wheels 5, fixed in axial direction by slots 6 in a bar 7 mounted rigidly between the walls 1 and 2. When rotating the shaft 4 the wheels 5 are moved by means of discs 8, fixed on the shaft 4 and provided with pins 9, projecting into holes 10 in the wheels 5. On the wheels 5 are laid tapes 11–15 of different lengths according to the divisions wanted. These tapes 11–15 are provided with holes 17 in order to be carried on by means of teeth 18 on the wheels 5. Further the tapes 11–15 are provided with pins 19 and letters 16 for identifying the positions of the pins 19. The other ends of the loops of the tapes 11–15 are supported by wheels 20, rotatably mounted on journals 21, attached to supports 22 fixed on a bar 23 between the two walls 1 and 2. The tapes are further freely movable through slots 24 in plates 25. The plates 25 are guided by means of slots 26 in the base 3 and by means of arms 27 rotatably mounted on a shaft 28 and rotatably fixed to the plates 25 by means of journals 29. Springs 30 attached to the arms 27 and to pins 31 fixed on the base 3 tend to rotate the arms 27 clockwise round the shaft 28 and thereby to elevate the plates 25. Above the plates 25 is mounted a case 32 extending between the walls 1 and 2. This case 32 is provided with a number of holes 33 into which the pins 19 can enter. In the case 32 a key-card 34 can be inserted.

On the shaft 28 two arms 35 are fixed supporting a bar 36. Further there is a lever 37 fixed on the shaft 28 provided with a projecting pin 38 which extends into a slot 39 in a lever 40 freely movable on a journal 41 fixed on the wall 1. On its left end in Figure 6 the lever 40 is provided with a ratchet 42 rotatably mounted on a journal 44 on the lever 40 and held against a stop 43 by means of a spring 45. A protruding pin 93 on the wall 1 serves as a stop for the ratchet 42 when rotating the shaft 4 by acting on a toothed wheel 56 fixed on the shaft 4. At the same end the shaft 4 is provided with a knob 57. A spring 58 between the wall 2 and the first of the discs 8 pushes the shaft 4 to the left in Figure 3 ensuring gripe between the pins 9 and the holes 10 in Figures 8a and b.

The device is covered by a case 47 provided with windows 48 and 59 for reading the letters 16 and signal-spots 53 respectively. Further the case is provided with slots 60 through which the wheels 5 project.

The device is handled as follows. After insertion of the key-card 34 in its case 32 whereby the inside key is set, the knob 57 is to be pressed to the right, Figure 3. Thereby the shaft 4 will be moved axially against the action of the spring 58 and the wheels 5 will be free to turn as the pins 9 are released from the holes 10. Now the outside key can be set by turning the wheels 5 to the desired positions of the letters 16 in relation to each other exactly as by a conventional pin-wheel ciphering machine. After the outside key is set the knob 57 is to be released whereby under the action of the spring 58 the shaft 4 will move axially so that the pins 9 enter the holes 10 and all the wheels 5 are again fixed to the shaft 4. The machine is now ready for use. When a handle-bar 49 is pressed down the shaft 28 rotates in counter-clockwise direction and the levers 27 will be moved in the same way when the bar 36 acts on the levers 27. Hereby the plates 25 will be lowered and the pins 19 fixed on the tapes 11–15 will be removed from the holes 33. At this moment the lever 40 with its ratchet 42 has reached the toothed wheel 56 and in its continued movement in clockwise direction, operated by the pin 38 on the lever 37, it pushes the toothed wheel 56 in counter-clockwise direction one step until stop against the pin 93. By this also all the five wheels are moved one step each and so the tapes 11–15 so that the pins 19 are moved in front of the next holes 33 respectively. When releasing the handle-bar 49 the spring 46 acts upon the lever 37 in clockwise direction so that the levers 27 under action of the springs 30 raise the plates 25 against the case 32 and the pins 19 enter into the holes 33. If the key-card 34 is provided with a hole in this position the pin 19 is not stopped as shown in Figure 5. If there is not a hole in the key-card 34 the pin 19 will be stopped against the key-card 34 at a lower position than in the first case. The differences in positions can be read in the windows 59 where the spots 53 appear according to the positions of the levers 51 which follow the movements of the plates 25 via pins 54 and slots 55. In the lower position of the plate 25 a spot appears in the window 59. In the higher position of the plate 25 no spot appears. At each step of the machine a combination of spots and no spots will therefore appear in the windows 59 according to the system of punching of the key-cards and can be read as letters in the five-unit system in telegraphic work. As 32 combinations are obtainable with 5 impulses and the international alphabet contains only 26 letters the exceeding number of combinations can be used as blind steps for making the feeding of the machine irregular. The series of letters thus obtained will used as additional letters for ciphering a clear text and vice versa. In order to obtain series as long as possible before repeating, the number of holes in the key-cards 34 in the different rows ought to be without common divisor. In order to obtain this by the same number of holes 33 in each row in the case 32 and the same width of the key-cards 34 the holes at the end of the rows are substituted by openings 95, if required, always permitting the pins 19 to enter. The divisions of the pins 19 mounted on the tapes 11–15 are chosen in such a way that when a pin 19 has left the last working hole 33 the next pin 19 will enter the place in front of the first hole 33 in the same row.

In order to cut down the dimensions of the key-cards another system of holes in the key-cards can be used as shown in Figures 10 and 11. Here a tape 62 is provided with six pins 63–65 disposed in three rows according to corresponding holes 66 in a key-card 67 and the device works as follows. A pin 64 traverses the positions $a$ in row I Figure 10, followed by a pin 65 traversing the positions $a$ in row III and thereafter by a pin 63 traversing the positions $a$ in row II. After that, the other pin 64 traverses the positions $b$ in row I and so on until all the pins have traversed the positions $a$ and $b$.

Instead of tapes 11–15 as carriers of pins 19 or tapes 62 and pins 63–65 drums 68 can be used as shown in Figures 12 and 13. Such a drum 68 is provided with a toothed wheel 69 idle on a common shaft 70 and connected to three pin-carriers 71–73 via studs 74 projecting into holes in the toothed wheel 69. These pin-carriers 71–73 are each provided with a pin 76–78 projecting through holes in the drum 68. They are movable against the action of springs 75. It will be clear from Figure 12 that when by stationary drum the toothed wheel 69 is turned clockwise the pins 76–78 will protrude until stopped. In this case the pins 76–78 are arranged into three axial positions in the drum 68 the key-card having three corresponding rows of holes as shown in Figure 14. In Figures 12 and 13 are shown the positions of parts corresponding to that in Figure 4; the handle bar is pressed down. When releasing it the bar 36 permits a slide 84 mounted on the base 3 to move towards the left in Figure 12 under action of a spring 81 acting on a signal-lever 80 in clockwise direction. A pin 82 on said lever 80 projects into a slot 83 in the slide 84. On the left hand side of the slide 84 a ratchet 85 is rotatably mounted on a journal 87 and is held in clockwise direction against a stop 86 under action of a spring 88. When under moving to the left in Figure 12 the ratchet 85 reaches the toothed wheel 69 and the drum 68 is fixed in its position the pins 76–78 will protrude by continued moving of the slide 84 and the actual pin for instance the pin 76 will enter the corresponding hole in a circular case 91 in which a key-card 90 can be inserted Figure 14. According to whether or not a hole is present in the key-card in the actual position the slide 84 will stop in one of two possible positions, which positions can be read in the same way as before described. The arrangement of the holes in three rows in the key-cards 90, Figure 14, for each drum is settled by practical considerations concerning the width of the key-card 90. The arrangement works in a similar way as described before with reference to Figure 11. When a pin for instance the pin 76 just has left the last hole in the row belonging to it the next pin for instance the pin 77 enters its first position in front of the first hole in the row belonging to it. The advance mechanism of the drums 68, the relative setting of the drums 68 and the position marking of the drums 68 can be carried into execution exactly as by conventional pin-wheel ciphering machines and is not shown here but is fully described for instance in the Hagelin Patent No. 2,089,603. This device, now described, may of course be applied to every ciphering machine system using pin- or key-wheels.

What I claim is:

1. In a ciphering machine the provision of a key card having perforations therein, key card pocket means comprising two spaced facing wall members, there being provided in said wall members rows of axially aligned perforations in spaced parallel relationship, said perforations being evenly spaced lengthwise of said rows, said pocket means being adapted to accommodate said key card, the key card perforations coinciding with some perforations in said pocket wall members and the remaining wall perforations being obturated by imperforate portions of said key card when said card takes its operative position within said pocket means, a plurality of carrier means, probing means on said carrier means, means for stepwise displacement of said probing means in unison with said carrier means through a distance corresponding to the spacing of said perforations lengthwise of said rows into consecutive positions of alignment between said probing means and said pocket wall perforations, actuating means adapted to make said probing means penetrate into said pocket wall perforations in each consecutive position of said carrier means, and indicating means connected to said actuating means and adapted to indicate the condition of penetration of said probing means engaging in turn consecutive pocket wall perforations.

2. In a ciphering machine the provision of a key card having perforations therein, a key card pocket comprising two flat wall members in spaced parallel relationship, a plurality of rows of evenly spaced axially aligned perforations in said pocket wall members, a series of endless flat carrier means extending in parallel spaced relationship along one of said wall members, probing means secured to said carrier means and extending perpendicularly from the surface thereof opposite said wall perforation rows, the said pocket being adapted to accommodate said key card, the perforations of said key card coinciding with at least some pocket wall member perforations when the key card is disposed within said card pocket, means for stepwise displacement of said carrier means along said perforation rows and into consecutive positions of alignment between said probing means and said pocket wall member perforations, actuating means to force said probing means into the pocket wall member perforations, at least some of which are obturated by imperforate portions of the said key card, and indicating means connected to the said actuating means and adapted to indicate the condition of penetration of said probing means engaging in turn each consecutive pocket wall member perforation in each row.

3. In a ciphering machine having a supporting structure, a key card pocket comprising two plate-shaped wall members in spaced parallel relationship, said wall members perforated by axially aligned holes disposed in spaced parallel rows with uniform spacing between said holes, a shaft member rotatably disposed beyond one lateral edge of the said card pocket and extending transversely of said rows of holes, said shaft member having a plurality of spaced wheels and being displaceable axially against the urge of resilient means, means for holding said wheels axially upon displacement of said shaft member, positive coupling means for each wheel rigidly secured to said shaft member and adapted to release the said wheels upon displacing said shaft member axially against the urge of the resilient means and to engage said wheels upon releasing said shaft member, further spaced rotatable wheels disposed along the opposite lateral edge of said card pocket and having their axes parallel to said shaft member, said further wheels being aligned with the first recited wheels, a series of endless tape members, said tape members each being guided over aligned opposing wheels, said first recited wheels and said tape members having interengageable positive drive means, said tape members having probe pins extending perpendicularly from the surface thereof and having letters for identifying the positions of said probe pins, said probe pins facing opposite said rows of holes, means for stepwise consecutive displacement of said tape members in unison a distance corresponding to the spacing between consecutive holes along the rows of holes in said pocket wall members, spring-urged actuating means adapted to urge said probe pins into said holes, a perforated key card the perforations of which correspond to some of said holes and aligned therewith when said card takes up its operative position within said card pocket, and indicating means operatively connected to said actuating means and adapted to indicate the condition of penetration of said probe pins engaging in turn each consecutive pocket wall member hole in each row.

4. In a ciphering machine the provision of a key card having perforations therein, key card pocket means comprising two coaxially disposed hemicyclindrical wall members defining a space therebetween, said space being adapted to receive and retain in a fixed position said key card, there being axially aligned perforations disposed with uniform angular spacing in spaced rows along the circumference of said wall members, the perforations in said key card coinciding with at least some of said wall member perforations when the card takes its position within said card pocket, the remaining wall perforations being obturated by imperfrorate portions of the card, rotatable drum means disposed coaxial with said wall members, probe means extending radially from within said drum means outside the same, said probe means being spaced circumferentially of said drum means and being disposed in laterally staggered relation, means for stepwise angular displacement of said drum means in accordance with the angular spacing of said wall member perforations, actuating means for displacing said probe means axially into engagement with consecutive wall member perforations, and indicating means connected to said actuating means to indicate the condition of penetration of said probing means engaging in turn consecutive pocket wall perforations.

5. A ciphering machine as claimed in claim 4, wherein each drum means comprises three probe pins and the perforations of the key card are grouped with three rows in each group.

6. In a ciphering machine having a supporting structure, a key card pocket comprising two plate-shaped wall members in spaced parallel relationship, said wall members having holes formed therein, a shaft member rotatably disposed beyond one lateral edge of the said card pocket, said shaft member having a plurality of spaced wheels and being displaceable axially, means for holding said wheels axially upon displacement of said shaft member, positive coupling means for each wheel rigidly secured to said shaft member and adapted to release the said wheels upon displacing said shaft member axially to engage said wheels upon releasing said shaft member, further spaced wheels disposed along the opposite lateral edge of said card pocket and having their axes parallel to said shaft member, said further wheels being aligned with the first recited wheels, a series of endless tape members, said tape members each being guided over aligned opposing wheels, said first recited wheels and said tape members having interengageable positive drive means, said tape members having probe pins extending perpendicularly from the surface thereof and disposed in laterally staggered relation thereon, the said holes formed in the wall members being disposed correspondingly, means for stepwise consecutive displacement of said tape members in unison a distance corresponding to the spacing between consecutive holes in the wall members, spring-urged actuating means adapted to urge said probe pins into said holes, a perforated key card having some perforations corresponding to some of said holes and aligned therewith when said card is in operative position within said card pocket, and indicating means connected to said actuating means to indicate the condition of penetration of the said probe pins.

7. A ciphering machine comprising in combination a housing, a key card pocket disposed in said housing, a key card having perforations therein to be received in said pocket, a series of rows of perforations in said pocket, the card perforations, when in operative position in the pocket, registering with some perforations in the said pocket and the remaining perforations in said pocket being obturated by the imperforate portions of the card, a plurality of carrier means, probing means on said carrier means for displacement with the carrier means through a distance corresponding to the spacing of the perforations into consecutive positions of alignment between the probing means and the pocket perforations, actuating means to force said probing means into the perforations in each position of the carrier, and indicating means visible from the outside of said housing to show the condition of penetration of the probing means.

References Cited in the file of this patent

UNITED STATES PATENTS

| | | |
|---|---|---|
| 1,201,486 | Marye | Oct. 17, 1916 |
| 1,441,239 | Murray | Jan. 9, 1923 |
| 1,646,969 | Lyman | Oct. 25, 1927 |
| 1,667,780 | Grassi | May 1, 1928 |
| 2,089,603 | Hagelin | Aug. 10, 1937 |
| 2,151,453 | Walker | Mar. 21, 1939 |
| 2,204,153 | Ryan et al. | June 11, 1940 |
| 2,270,137 | O'Brien | Jan. 13, 1942 |
| 2,624,958 | Feine | Jan. 13, 1953 |